Aug. 31, 1926.
L. A. KEPLER
1,598,082
CAMERA CRADLE MOUNT
Filed May 11, 1923
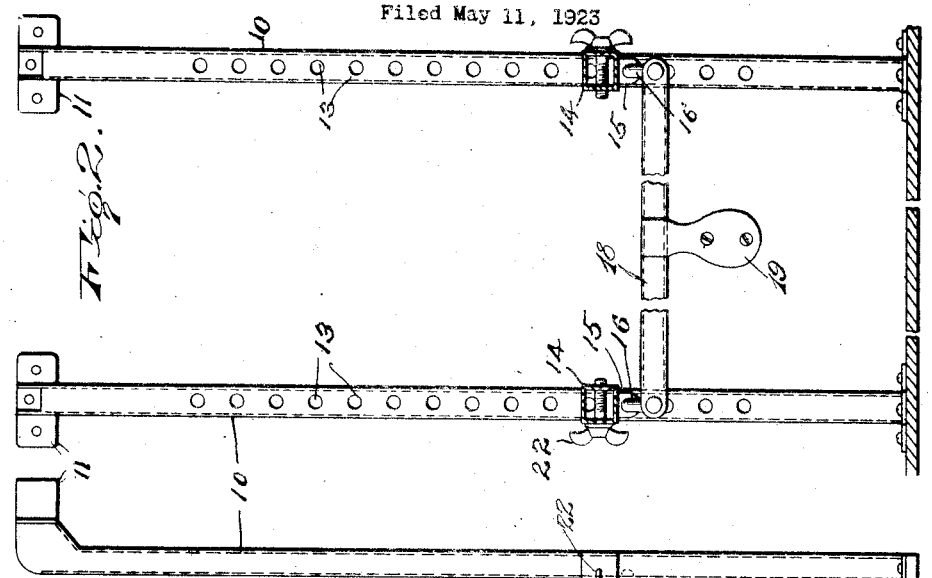
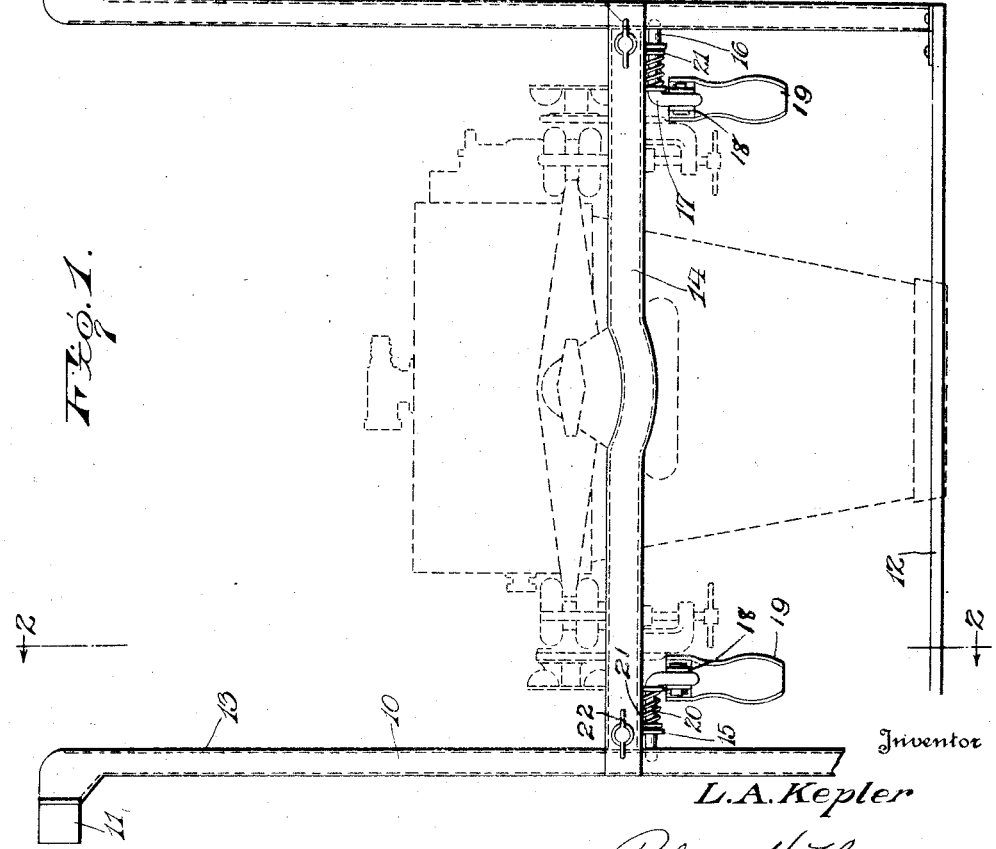
Inventor
L. A. Kepler
By Robert H. Young
Attorney Patented Aug. 31, 1926.

1,598,082

UNITED STATES PATENT OFFICE.

LAWRENCE A. KEPLER, OF DAYTON, OHIO.

CAMERA CRADLE MOUNT.

Application filed May 11, 1923. Serial No. 638,247.

This invention relates to aeronautics and the object thereof resides in the provision of a camera cradle support adapted for use on airplanes.

More specifically this invention contemplates the provision of an adjustable camera support capable of receiving cameras of various sizes and types while also providing a support of minimum weight and maximum strength. A further object of this invention is to provide an all-metal camera cradle support comprising essentially four uprights, a pair of camera-carrying cross members adjustable on said uprights and readily accessible means for retaining the cross members in adjusted positions on the uprights.

With these objects in view, the invention consists in the novel construction, combination and arrangement herein fully described, illustrated and claimed.

In the drawings:—

Fig. 1 is a front elevation of the camera mount, showing the camera in dotted lines, and Fig. 2 is a section taken on line 2—2 on Figure 1.

Referring to the parts by reference numerals, the device as shown, comprises four uprights 10 spaced as clearly shown in Figure 2, fixedly secured at their upper ends to the longérons 11 and at their lower ends to the floor 12 of the cockpit of the airplane. These uprights 10 are preferably made of sheet metal the same being square in cross section. Each of the uprights 10 in one wall thereof is provided with a series of apertures 13 for a purpose to be hereinafter set forth. A pair of cradle supporting cross members 14 are adjustably carried by the uprights 10, the said cross members 14 being bifurcated at their ends to straddle the uprights 10. The under faces of the cross members 14, adjacent the ends, having depending bearings 15 bent therefrom which slidably carry locking members 16 that are preferably formed of metal, circular in cross section, and are adapted to have one end thereof projected into certain of the apertures 13. The opposite ends of the locking members 16 from that previously described, are bent downwardly as at 17 and are connected in pairs by the strips 18. Hand grips 19 are suitably fastened to the strips 18 intermediate the length thereof. Each of the locking members 16 has wound about a portion thereof, a coil spring 20, one end of which is in engagement with one of the depending bearings 15 and the other end in engagement with a collar 21 fixedly secured on the locking member 16. These coil springs being of the expansible type, urge the locking members into the locked position, that is, in a position as shown in Figure 1. To assist in retaining the cross arms 14 in an adjusted position on the upright 10, thumb screws 22 are provided, the same passing through the cross arms adjacent the ends thereof and providing means whereby the bifurcated ends of the cross arms can be somewhat compressed to effect a gripping action of the same against the uprights 10.

In operation, the cradle is secured to the cross arms 14 by clamping means, the said cross arms being curved downwardly intermediate the length thereof to form a clearance for the conventional wing clamp on the cradle. The cross arms 14 are retained in the desired position by means of the locking member 16 entering certain of the apertures 13, and secured from rattling, due to vibration, by means of the thumb screws previously described. When it is desired to move the cross arms relatively to the uprights 10 the thumb screws are loosened thereby allowing free movement of the bifurcated ends of the cross arms on the uprights and by means of the grips 19 the locking members 16 are moved against the tension of the springs 20 out of engagement with the uprights and the two cross arms and locking means move as a unit on the uprights to the desired position when the locking members can be inserted in certain of the apertures 13 and the thumb screws tightened to retain the cross arms in the position obtained.

Having thus described my invention, I claim:

1. An aeronautical camera support, including spaced uprights, camera supports adjustable on said uprights, means for releasably retaining said camera supports on said uprights and a second spring actuated means to secure said camera supports on said uprights in its adjusted positions.

2. An aeronautical camera support including spaced uprights, camera supporting means adjustably connected with said uprights and locking means on said supporting means including a series of spring actuated members adapted to engage said uprights to releasably retain said supporting means in adjusted positions on said uprights.

3. An aeronautical camera support including spaced uprights, camera supporting means adjustably connected with said uprights, locking means for releasably retaining said supporting means on said uprights in its adjusted positions and spring actuated means for clamping the ends of said supporting means in engagement with said uprights.

4. An aeronautical camera support including spaced uprights, each having a plurality of openings in one face thereof, a pair of cross members for supporting a camera, a spring actuated locking member on each end of said cross members adapted to engage in said openings in said uprights and means connecting certain of said locking members having hand grips thereon to facilitate the manual operation of said locking members.

5. An aeronautical camera support, including spaced uprights, a pair of cross members for supporting a camera, each end of said cross members being bifurcated to receive one of said uprights, means to releasably retain said cross members in adjusted positions on said uprights and a second means for clamping the bifurcated ends of said cross members against said uprights for the purpose set forth.

6. An aeronautical camera support, including spaced uprights, camera supports adjustable on said uprights, means for releasably retaining said camera supports on said uprights and a second spring actuated means independent of said first means to assist in the retention of said camera supports in their adjusted positions on said uprights.

In testimony whereof, I affix my signature.

LAWRENCE A. KEPLER.